US005986786A

United States Patent [19]
Crandall, Jr. et al.

[11] Patent Number: 5,986,786
[45] Date of Patent: Nov. 16, 1999

[54] PASSENGER CONVEYANCE VEHICLES AND SYSTEMS UTILIZING THE SAME

[75] Inventors: William F. Crandall, Jr., Sausalito, Calif.; Billie L. Bentzen, Berlin, Mass.

[73] Assignee: Talking Signs, Inc., Baton Rouge, La.

[21] Appl. No.: 08/754,240

[22] Filed: Nov. 20, 1996

[51] Int. Cl.$^6$ .................................................. H04B 10/00
[52] U.S. Cl. .......................... 359/154; 359/156; 359/172; 340/573; 340/692
[58] Field of Search .................................... 359/154, 152, 359/153, 113, 155, 172; 250/214 AL, 214 B, 214 DC, 214 R; 340/825.72, 691, 692, 540, 573; 434/395

[56] References Cited

U.S. PATENT DOCUMENTS

| | | | |
|---|---|---|---|
| 4,680,811 | 7/1987 | Harper et al. | 359/172 |
| 4,977,619 | 12/1990 | Crimmins | 359/172 |
| 5,027,433 | 6/1991 | Menadier et al. | 359/152 |
| 5,095,382 | 3/1992 | Ahe | 359/189 |
| 5,485,139 | 1/1996 | Tarnovsky | 359/155 |
| 5,495,357 | 2/1996 | Osterhout | 359/152 |
| 5,623,358 | 4/1997 | Madey | 359/172 |

OTHER PUBLICATIONS

Letter—Royal National Institute for the Blind—1 pg.—Jan. 16 1995.

Resolution of American Council of the Blind—1 pg.—Approved Jul. 6, 1990.

Resolution of Board of Supervisors of San Francisco—3 pgs. (on 2 sheets)—Approved Apr. 24, 1992.

Brochure headed "Talking Signs® . . . they speak for themselves"—8 pgs.—1994.

Paper: "The Accessible City"; By William Loughborough—1981—3 pgs.

(List continued on next page.)

*Primary Examiner*—Rafael Bacares
*Attorney, Agent, or Firm*—John F. Sieberth; R. Andrew Patty II

[57] ABSTRACT

Described are novel passenger conveyance vehicles and passenger transit systems which are configured to transmit signals which, when properly received and converted, provide intelligible non-visual communication to current and/or prospective passengers. On embodiment relates to improvement in a passenger conveyance vehicle having front, back and side portions defining an enclosure for occupation by one or more passengers, one of the side portions having therein at least one door mechanism enabling passenger ingress to and egress from the vehicle, the side portion being hereinafter referred to as the door side, the improvement comprising a frontal transmitter disposed at the front of the vehicle and delivering a frontal frequency modulated lightwave signal in a three-dimensional pattern so as to enable a person disposed ahead of and on the door side of the approaching vehicle to be within the frontal signal pattern as the vehicle continues along at least a substantial portion of its normal line of travel and approaches such person; the front signal, if suitably received and converted, providing intelligible communication to a person within the frontal signal pattern. In another embodiment, the invention provides a passenger transit system comprising a) a plurality of terminals at which one or more conveyance vehicles periodically arrive and depart, the terminals each having at least one adjacent walkway, and the conveyance vehicles each having front, back and side portions defining an enclosure for occupation by one or more passengers, one of the side portions having therein at least one door mechanism enabling passenger ingress to and egress from the vehicle; and b) at least one transmitter disposed at each of one or more of the terminals, each transmitter delivering a frequency modulated lightwave signal in a three-dimensional pattern so as to enable a person using the walkway to be within the pattern of the transmitter as the person approaches the respective terminal; the signals from each of the transmitters being the same or different, and if suitably received and converted, providing intelligible communication to a person within the pattern. In a preferred embodiment, the transit system further comprises a frontal transmitter as described above.

46 Claims, 10 Drawing Sheets

OTHER PUBLICATIONS

Report: "Remote Information Accessibility By Infrared Signage"; By: The Smith–Kettlewell Eye Research Institute; Mar. 15, 1991; pp. 1–10 and Appendix A, B–1 an B–2.

Resolution of Board of Supervisors of San Franscisco—1 page—Approved Apr. 13, 1992.

Report: "Talking Signs"—An Accessibility Solution for the Blind and Visually Impaired; By William Loughborough; 1986—9 pgs.

Paper: "(Question 13) 1. Signage for the blind and visually impaired"; By the Smith–Kettlewell Eye Research Institute, Rehabilitation Engineering Center; Feb. 21, 1991; 1 pg.

Paper: "The Accessible Planet"; By William B. Loughborough—The Smith–Kettlewell Eye Research Institute; 1991—2 pgs.

Report: "Talking Signs System: Guide For Trainers"; By Billie Bentzen, et al; Jun. 15, 1995—39 pgs.

Report: "Transit Accessibility Improvement Through Talking Signs Remote Infrared Signage: A Demonstration and Evaluation"; By William Crandall, et al; Mar. 15, 1995; 31 pgs.

Talking Signs Remote Infrared Signage: A Guide for Transit Managers; By William Crandall, et al; Jun. 15, 1995—23 pgs.

Talking Signs—Brochure—2 pgs.—Undated.

Brochure: "Talking Signs . . . they speak for themselves" (picture different from prior brochure with same title)—1994—2 pgs.

Letter from City and County of San Francisco—1 pg.—Dated Mar. 1, 1993.

Talking Signs, Inc.—"For Immediate Release"—1 pg.—Undated.

"Winning Solutions"—"1994 PTI Technology Achievement Awards"—Brochure—2 pgs.—Mar. 1995.

Excerpt from San Francisco Examiner—Bill Mandel Column—1 pg.—Present copy Undated.

Smith–Kettlewell Eye Research Institute, Bart & Muni—News Release—3 pgs.—Sep. 9, 1994.

Article from The Urban Transportation Monitor—1 pg.—Sep. 30, 1994.

Reprint from Identity Magazine—4 pgs.—Reprinted from Mar./Apr. 1994 issue.

The Beach News, vol. 9, No. 2, p. 5—1 pg.—Jan. 12, 1995.

Excerpt from San Francisco Examiner—"New aid for the blind"—1 pg.—Jun. 1990.

Newspaper article "Clearing way for blind"—1 pg.—May 17, 1992.

Apparent excerpt from Identity Magazine "A Light in the Darkness"—1 pg., 1994.

Excerpt from Cape Cod Times "High–tech signs 'talk' to blind"—1 pg.—Oct. 6, 1994.

Excerpt from Manchester Evening News "Bosses help by talking shop"—1 pg.—Nov. 6, 1993.

Paper entitled "Infrared Remote Signage Application for Transit Accessiblity"—3 pgs., Mar. 1996.

Talking Signs, Inc.—"Overview"—1 pg. and "Accessible City Project, San Francisco"—1 pg.—All undated.

Letter to the ATBCB from Smith–Kettlewell REC in Support of "Remote Signage", and Overview, 1980, 5 pages.

Loughborough, W., "Talking Lights", Journal of Visual Impairment and Blindness, 1979, pg. 243.

Brabyn, John, et al., "Speech Intelligibility of the Talking Signs", Journal of Visual Impairment and Blindness, 1982, pp. 77–78, 2 pages.

Brabyn, Lesley, et al., "An Evaluation of "Talking Signs" for the Blind", Human Factors, 1983, vol. 25(1), pp. 49–53, 5 pages.

Schenkman, B.N., "The Effect of Receiver Beamwidth on the Detection Time of a Message From Talking Signs, An Auditory Orientation Aid for the Blind", International Journal of Rehabilitation Research, 1986, vol. 9(3), pp. 239–246, 8 pages.

BLOCK DIAGRAM OF FM TRANSMITTER WITH AMBIENT LIGHT DETECTION FOR OUTPUT CONTROL.

SCHEMATIC DIAGRAM OF FM TRANSMITTER WITH AMBIENT LIGHT DETECTION FOR OUTPUT CONTROL.

SCHEMATIC DIAGRAM OF FM TRANSMITTER WITH AMBIENT LIGHT DETECTION FOR OUTPUT CONTROL.

RECEIVER FRONT END BLOCK DIAGRAM

TRF FM RECEIVER WITH NOISE OPERATED SQUELCH BLOCK DIAGRAM

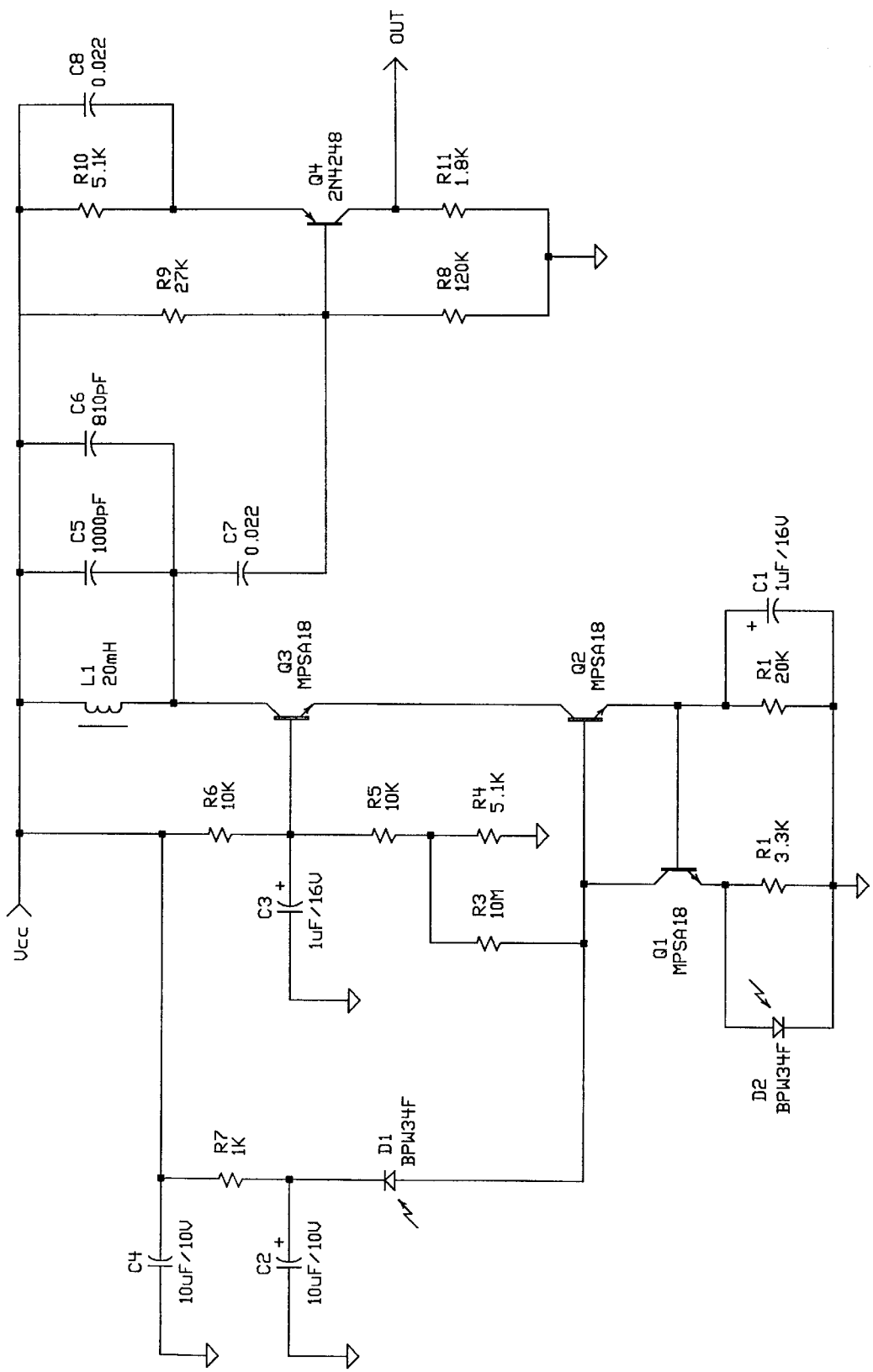
FIG. 7 RECEIVER FRONT END SCHEMATIC DIAGRAM

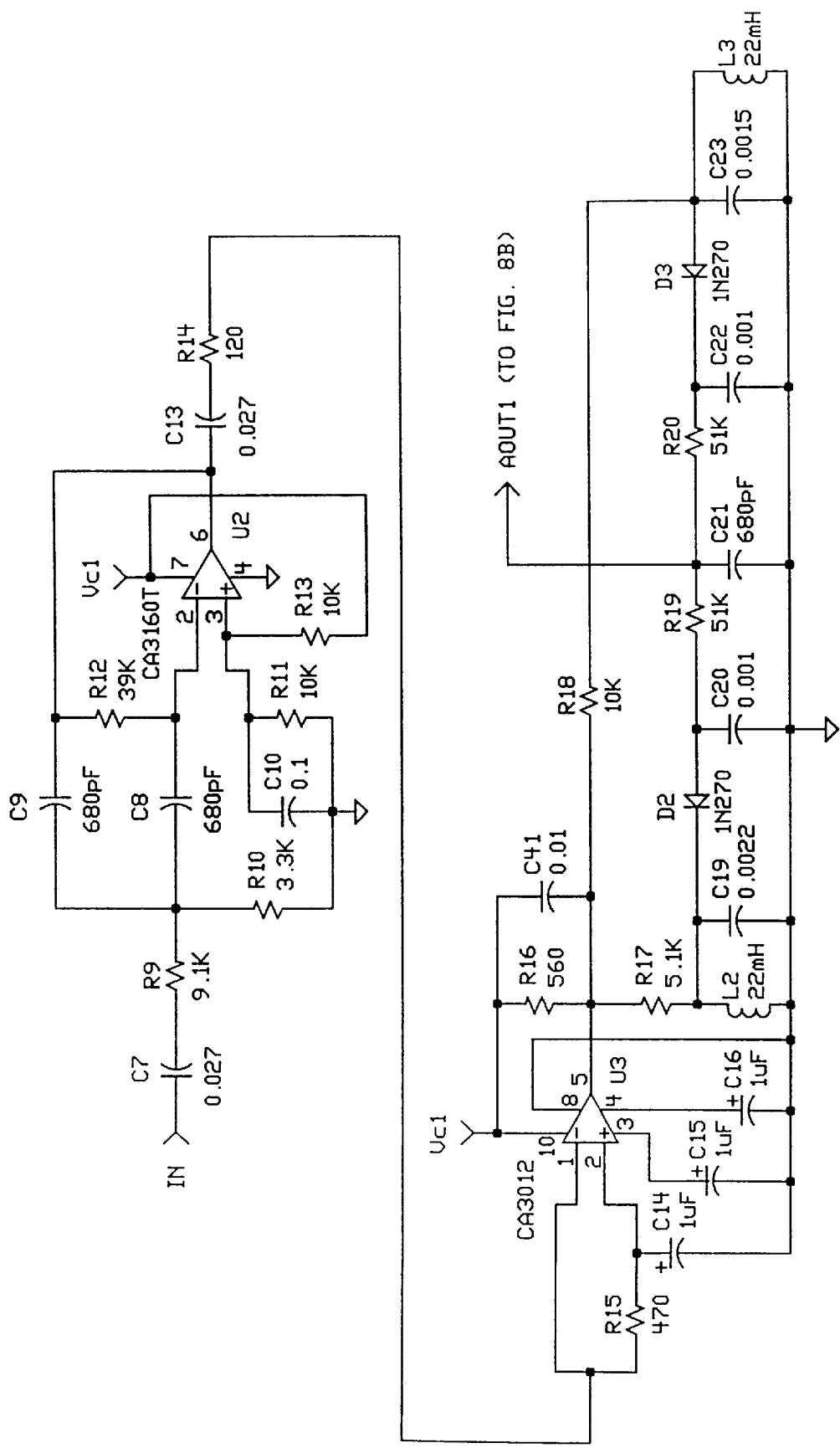
FIG. 8A TRF FM RECEIVER WITH NOISE OPERATED SQUELCH SCHEMATIC DIAGRAM

TRF FM RECEIVER WITH NOISE OPERATED SQUELCH SCHEMATIC DIAGRAM

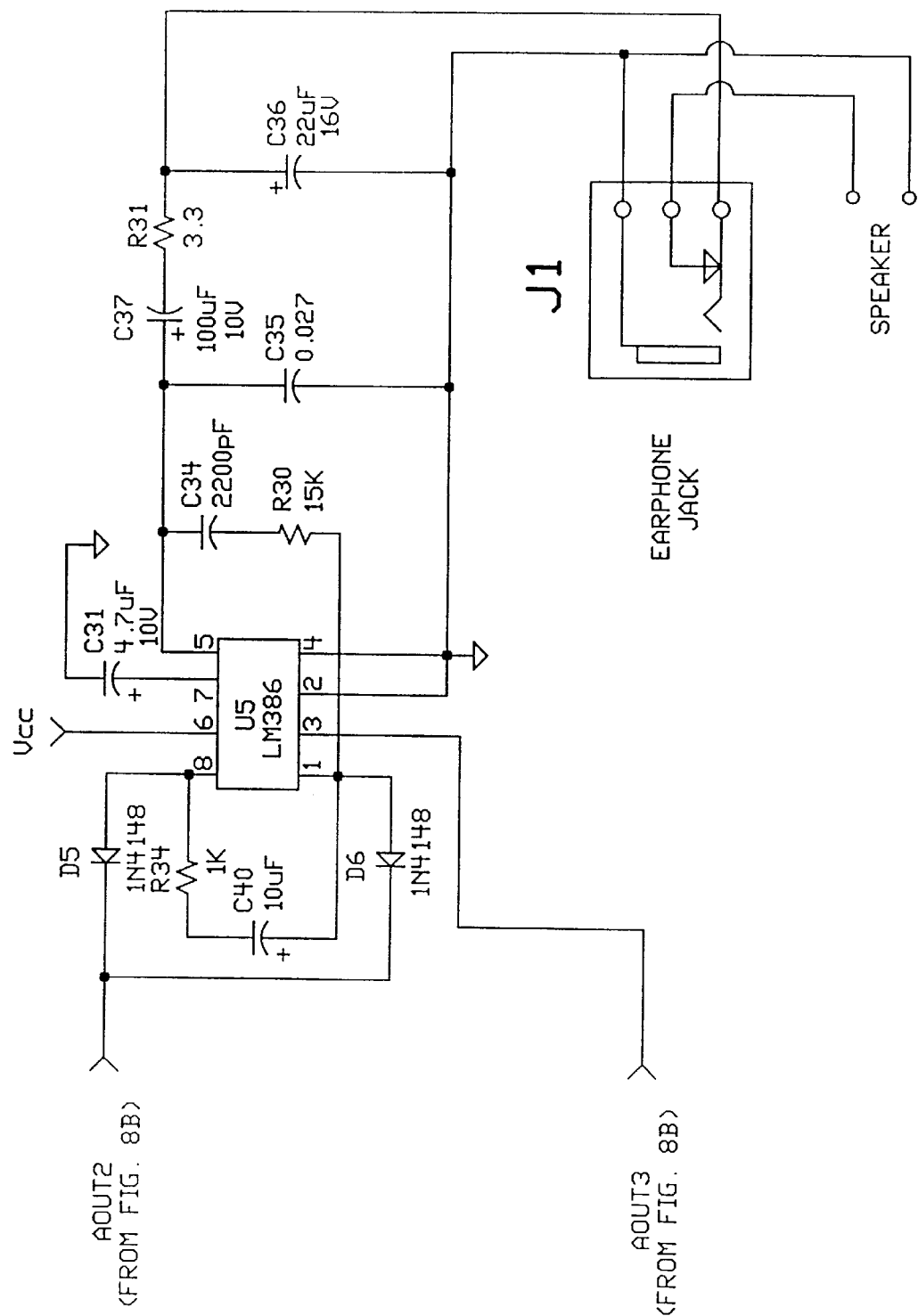
FIG. 8C  TRF FM RECEIVER WITH NOISE OPERATED SQUELCH SCHEMATIC DIAGRAM

PASSENGER CONVEYANCE VEHICLES AND SYSTEMS UTILIZING THE SAME

TECHNICAL FIELD

This invention relates to passenger conveyance vehicles and passenger transit systems which are configured to transmit signals which, when properly received and converted, provide intelligible non-visual communication to current and/or prospective passengers.

BACKGROUND

Over the past several years, many changes have taken place to make public areas and accommodations more accessible and functional for those members of society burdened by impaired physical or sensory function. Many of these changes have been mandated by changes to federal law, while others have resulted from increased awareness of the obstacles posed by many public facilities for persons with disabilities. However, notwithstanding these improvements, many public transportation facilities, such as, for example, bus stations and stops, railroad stations, and airport terminals, continue to pose obstacles for those persons who are visually impaired. It has proven difficult to efficiently provide refusable, non-visual communication of detailed information to individual users of such facilities. As a result, notwithstanding large expenditures of public funds, public transportation facilities remain underutilized while a segment of the population is struggling to find accessible transportation.

In addition, heretofore communication devices employing transmitters and receivers of lightwave signals have failed to adequately perform under conditions where significant ambient light (e.g., sunlight) is present. Information-carrying lightwave signals produced by such devices were often undiscernible on account of the noise or interference produced by such ambient light. Moreover, prior developments have proven inadequate in regulating the effective range of the transmitters employed to optimize the signal for the particular application at hand to insure a constant, reproducible, reliable range of effective transmission.

Thus, a need exists for transportation vehicles and transit systems with enhanced accessibility and functionality from the perspective of visually-impaired persons. Such devices are needed not only to enhance the quality of certain peoples' lives, but also to enhance the value of transportation systems by broadening their use to include all members of the public. Moreover, a need exists for vehicles and systems which are adapted to provide this accessibility and functionality under conditions which may include varying levels of sunlight or other forms of ambient light energy.

SUMMARY OF THE INVENTION

This invention is deemed to fulfill these important needs by providing, among other things, transit systems which are capable of effectively and efficiently transmitting intelligible non-visual communication to current and/or prospective passengers. More particularly, this invention provides a passenger transit system comprising:

a) a plurality of terminals at which one or more conveyance vehicles periodically arrive and depart, the terminals each having at least one adjacent walkway, and the conveyance vehicles each having front, back and side portions defining an enclosure for occupation by one or more passengers, one of the side portions having therein at least one door mechanism enabling passenger ingress to and egress from the vehicle; and b) at least one transmitter disposed at each of one or more of the terminals, each transmitter delivering a frequency modulated lightwave signal in a three-dimensional pattern so as to enable a person using the walkway to be within the pattern of the transmitter as the person approaches the respective terminal;

the signals from each of the transmitters being the same or different, and if suitably received and converted, providing intelligible communication to a person within the pattern. As used herein when describing systems or devices of this invention, terminal means either the end point of a route traveled by the conveyance vehicle, or a stopping point which is periodically visited by the conveyance vehicle between other points in a transit route. In a preferred embodiment, the system further comprises a frontal transmitter disposed at the front of the vehicle and delivering a frontal frequency modulated lightwave signal in a three-dimensional pattern so as to enable a person disposed ahead of and on the door side of the approaching vehicle to be within the frontal signal pattern as the vehicle continues along at least a substantial portion of its normal line of travel and approaches such person; the front signal, if suitably received and converted, providing intelligible communication to a person within the frontal signal pattern. The signals in a preferred embodiment of this passenger transit system are suitably received and converted by an electronic receiver, and more preferably a portable directional receiver. In a particularly preferred embodiment, the portable directional receiver comprises a non-visual communicator, a self-contained source of electrical energy, a detector for receiving a sensed frequency modulated lightwave signal, and electronics comprising an active sink for ambient light-induced steady state detector photocurrent, a primary PIN photodiode operated in the photoresistive mode, and a secondary PIN photodiode operated in the photovoltaic mode, the electronics converting the sensed signal into intelligible non-visual communication emanating from the communicator both in the presence and in the absence of an ambient background of light energy, and the receiver being effective as the sensed signal approaches the shot noise detection limit of the primary PIN photodiode in the presence of a steady state photocurrent. This particular portable directional receiver is described in greater detail in commonly owned, copending U.S. patent application Ser. No. 08/496,970 filed on Jun. 30, 1995 (now U.S. Pat. No. 5,623,358 issued on Apr. 22, 1997).

In another particularly preferred embodiment, the frequency modulated lightwave signal is of variable intensity, and each transmitter comprises (a) an emitter for sending the frequency modulated lightwave signal, (b) a light energy receiver for detecting a change in the level of surrounding ambient light energy and for producing a response to such change in proportion to the change detected, and (c) a controller for adjusting, directly or indirectly, the frequency modulated lightwave signal in response to the light energy receiver response to the change detected. This preferred transmitter is described in greater detail in commonly owned, copending U.S. patent application Ser. No. 08/754,275 filed on Nov. 20, 1996 (Attorney Docket No. S-609) now U.S. Pat. No. 5,757,530.

Another embodiment of this invention is a passenger transit system comprising:

a) at least one conveyance vehicle having front, back and side portions defining an enclosure for occupation by one or more passengers, one of the side portions having therein at least one door mechanism enabling passenger ingress to and egress from the vehicle, the side portion being hereinafter referred to as the door side; and b) a frontal transmitter disposed at the front of the vehicle and delivering a frontal frequency modulated lightwave signal in a three-dimensional pattern so as to enable a person disposed ahead of and on the door side of the approaching vehicle to be within the frontal signal pattern as the vehicle continues along at least a substantial portion of its normal line of travel and approaches such person;

the frontal signal, if suitably received and converted, providing intelligible communication to a person within the frontal signal pattern. Preferably, the system further comprises one or more of the following:

(i) a side transmitter disposed at the door side of the vehicle and delivering a side frequency modulated lightwave signal in a three-dimensional pattern so as to enable a person in proximity to the vehicle when stopped and disposed either ahead of and to the door side of the vehicle, directly to the door side of the vehicle, or behind and to the door side of the vehicle to be within the side signal pattern while the vehicle remains stopped;

(ii) an interior transmitter disposed within the vehicle and delivering a interior frequency modulated lightwave signal in a three-dimensional pattern so as to enable a person within the vehicle also to be within the interior signal pattern; and (iii) a ground-based transmitter disposed in proximity to a point of conveyance vehicle passenger embarking and/or disembarking, the ground-based transmitter delivering a ground-based frequency modulated lightwave signal in a three-dimensional pattern so as to enable a person in proximity to the point of embarking and/or disembarking to be within the ground-based signal pattern.

In each case, the respective signals present may be the same or different and, if suitably received and converted, provide intelligible communication to a person within their respective patterns.

This invention also provides improvements in the passenger conveyance vehicles, as further described below.

These and other embodiments and features of the invention will become still further apparent from the ensuing description, appended claims and accompanying drawings.

BRIEF DESCRIPTION OF THE DRAWINGS

FIG. 7 is a detailed schematic diagram of the electronics of the front end of a typical electronic receiver of this invention.

FIGS. 8A, 8B and 8C, taken together, are a detailed schematic diagram of the electronics of a means in the electronic receiver for filtering and detecting the received signal and for squelching ambient background noise as well as intrinsic electronic circuit noise.

In FIGS. 1–2, like letters and/or numerals are used to refer to like parts among the figures. Likewise, in the groups of FIGS. 3–4B and FIGS. 5–8C, respectively, like letters and/or numerals are used to refer to like parts among the figures.

DESCRIPTION OF PREFERRED EMBODIMENTS

As may now be appreciated, the transit systems and conveyance vehicles of this invention are quite various in their application. The conveyance vehicles may be in the form of, for example, buses and other automobiles, surface trains, subway trains, airplanes, boats, etc. The transit systems likewise may be in the form of, for example, bus transit systems and stations, rail systems and stations, airport terminals, harbor areas, etc.

Figure 1:
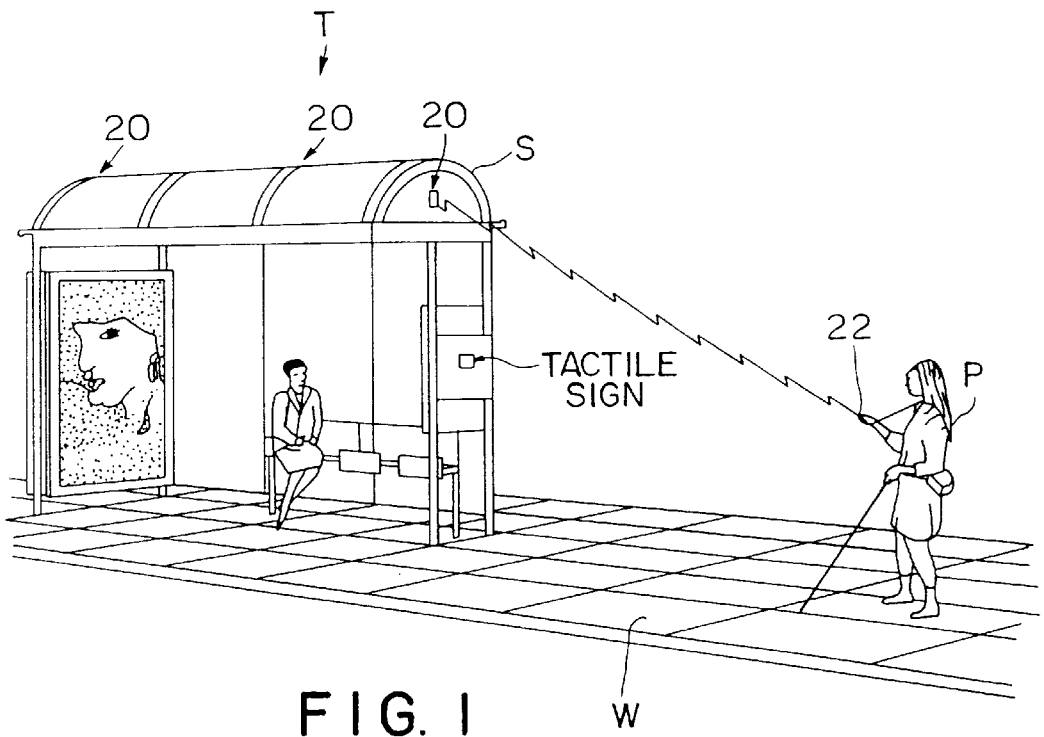
FIG. 1 is a view in perspective of a preferred transit system bus stop of this invention.
Figure 2:
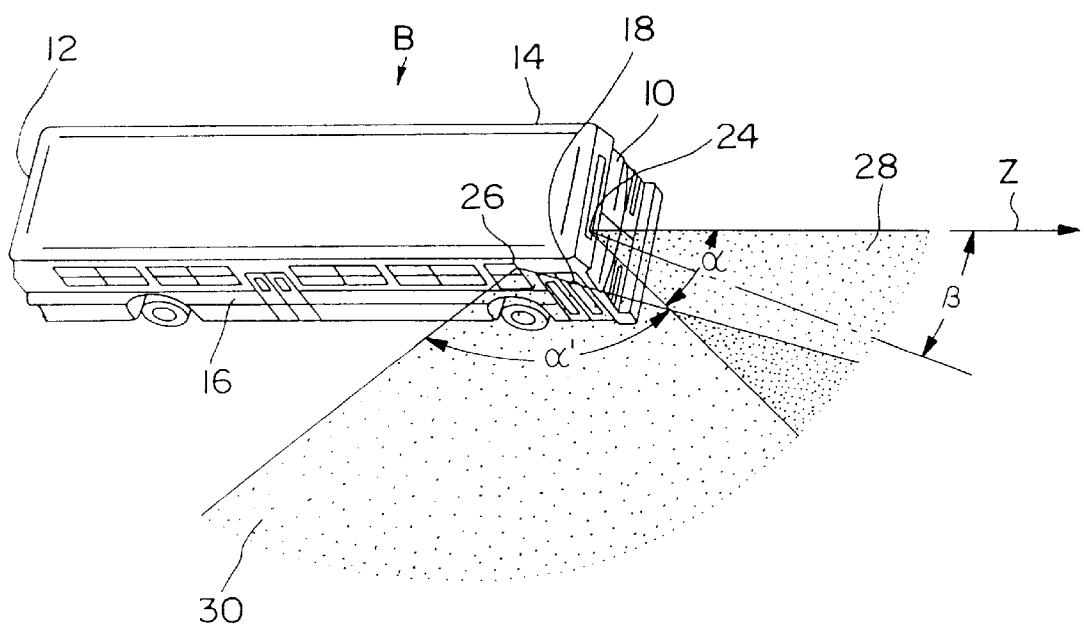
FIG. 2 is an elevated view in perspective of a bus equipped with transmitters of this invention and illustrating the signal patterns of the frontal and side transmitters.

Referring now to the drawings, one embodiment of this invention is depicted in FIGS. 1 and 2, which illustrate parts of a transit system comprising a plurality of terminals or, in this case bus stops T (only one depicted at FIG. 1) at which one or more conveyance vehicles in the form of bus B (FIG. 2) periodically arrive and depart, stop T having an adjacent walkway W. A conveyance vehicle in the form of bus B has a front portion 10, a back portion 12 and side portions 14 and 16 defining an enclosure for occupation by a passenger P. Side portion 16 has a door mechanism 18 enabling passenger ingress to and egress from bus B. Stop T as depicted includes a shelter S, and three transmitters 20 are disposed at different portions of shelter S. These ground-based transmitters, alone or in combination, deliver a frequency modulated lightwave signal in a three-dimensional pattern so as to enable passenger P using walkway W to be within their signal pattern as passenger P approaches stop T. The signals from transmitters 20 may be the same or different, and are receivable by electronic receiver 22, which provides intelligible communication to passenger P while within the signal pattern of transmitters 20. As may be seen from FIG. 1, transmitters 20 are disposed in proximity to a point of passenger embarking to and/or disembarking from bus B (i.e., stop T).

As seen on FIG. 2, bus B further includes a frontal transmitter 24, a side transmitter 26, and an interior transmitter (not shown). Frontal transmitter 24 is disposed at front portion 10 and delivers a frequency modulated lightwave signal in a three-dimensional pattern 28 so as to enable a person disposed ahead of and on the door side of bus B to be within pattern 28 as bus B continues along at least a substantial portion of its normal line of travel and approaches such person. As depicted, the pattern 28 is cone-like and has a beam width α which is preferably in the range of about 30° to about 90° projected outwardly in front of bus B such that the axis of pattern 28 is oriented at a predetermined angle β (in the range of about 0° to about 90°) relative to line of travel Z.

Side transmitter 26 is disposed at side portion 16 and delivers a frequency modulated lightwave signal in a three-dimensional pattern 30 so as to enable a person in proximity to bus B when stopped and disposed either ahead of and to the door side of the vehicle, directly to the door side of the vehicle, or behind and to the door side of the vehicle, to be within pattern 30 while bus B remains stopped. As depicted, the pattern 30 is cone-like and has a beam width α' which is preferably in the range of about 60° to about 170° projected outwardly from side portion 16 such that the axis of pattern 30 is oriented in a predetermined direction to maximize exposure of potential passengers to the side signal. The interior transmitter (not shown) is disposed within bus B and delivers a frequency modulated lightwave signal in a three-dimensional pattern (not shown) so as to enable a person within bus B also to be within the interior signal pattern. The interior signal also may be reflected within bus B to insure complete dissemination of the interior signal to all passengers within bus B.

To insure adequate exposure of potential passengers to the signals, it is preferred that the frontal signal be adjusted to extend for a distance of at least 300 feet ahead of the vehicle, that the side signal be adjusted to extend for a distance of at least 30 feet from the door side of the vehicle, and that the interior signal be adjusted to extend for a distance sufficient to traverse substantially all passengers within the vehicle during normal use.

With regard to components of the transmitters of this invention may be single or multi-channel transmitters (i.e., may transmit signals at one or more carrier frequencies), and will include emitters comprised of one or more diodes. The lightwave produced by the emitters may be any within the spectrum, but is preferably infrared. The emitter is one or more infrared diode arrays in particularly preferred embodiments. It is also preferred that each diode within the array deliver a frequency modulated infrared signal (preferably continuous) in a pattern approximate to that of a cone and having a beam width in the range of about 10° to about 60° at a modulated frequency of about 25 KHz, a band width in the range of about 3 to about 6 KHz, and an infrared carrier frequency in the range of about 850 to about 950 nanometers. If desired, the signal may be conditioned to have a subcarrier deviation of about 2.5 kHz and a modulation index of 0.76. While these are the preferred frequencies, band widths and carrier frequencies, various combinations of different frequencies, band widths and carrier frequencies may be used and are within the scope of this invention, so long as the effective transmission of a signal is accomplished.

The light energy receiver of this invention may be any device capable of detecting a change in the level of surrounding ambient light energy and producing a response to such change in proportion to the change detected. The response produced may take the form of a change in resistance at the terminal location of the receiver in the circuitry, or it may take the form of other changes in the electrical characteristics of the receiver at such terminal. For example, a change in voltage in the case of photogenerative devices, conductivity in the case of a photoresistive device, a change in reactance in the case of photoreactive devices (i.e., devices which change either capacitance or inductance as a function of changes in light energy detected), etc. may also be generated by the light energy receiver, as long as the response produced is in some proportion (directly or inversely, linearly or nonlinearly) to the detected changes in ambient light levels. Preferably, the light energy receiver is a photocell having a resistance which is inversely proportional to the ambient light energy detected. Particularly preferred is a cadmium sulfide photocell having these resistance characteristics and a nominal resistance in the range of about 25 Kilohms to about 2 Megohms.

The controller component may be any device capable of adjusting, directly or indirectly, the frequency modulated lightwave signal in response to the light energy receiver response to the change detected. By directly or indirectly it is meant that the controller may operate directly to control the strength of the lightwave signal produced by the transmitter within the transmitter itself, or may operate indirectly by adjusting the strength of the signal input to the emitter. The magnitude of the adjustment will depend in part upon the particular controller employed. Preferably, the controller is a variable gain amplifier producing a gain magnitude as further described below.

Figure 3:
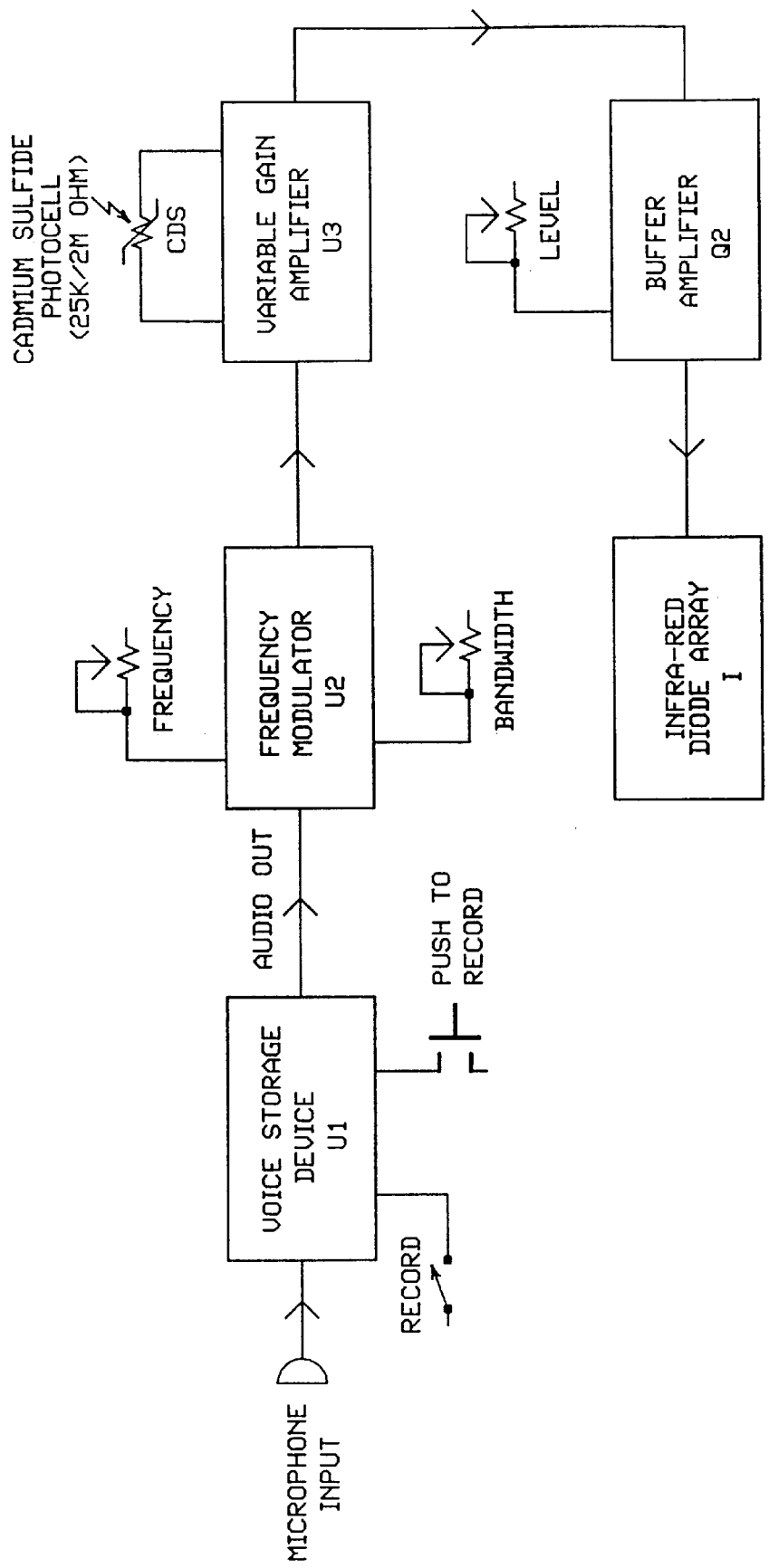
FIG. 3 is a block diagram of the control logic of a preferred apparatus of this invention.

Referring now to FIG. 3, the voice or sound message to be transmitted is stored in the sound storage device in the form of integrated circuit U1. The sound is stored via the microphone depicted by placing switch SW1 in the RECORD position (closed) and pressing the PUSH TO RECORD switch SW2 while playing or speaking the desired sound into the microphone. Circuit U1 stores the message into internal memory and continually transmits the message to the frequency modulator in the form of integrated circuit U2 when switch SW2 is released and switch SW1 is opened.

The audio signal from sound storage circuit U1 is frequency modulated by frequency modulator circuit U2. In the device depicted, the nominal carrier or center frequency is 25 KHz and the nominal modulation bandwidth is 6 KHz. The carrier frequency is set by a potentiometer R13 and the modulator bandwidth is set by a potentiometer R11.

Figure 4A:
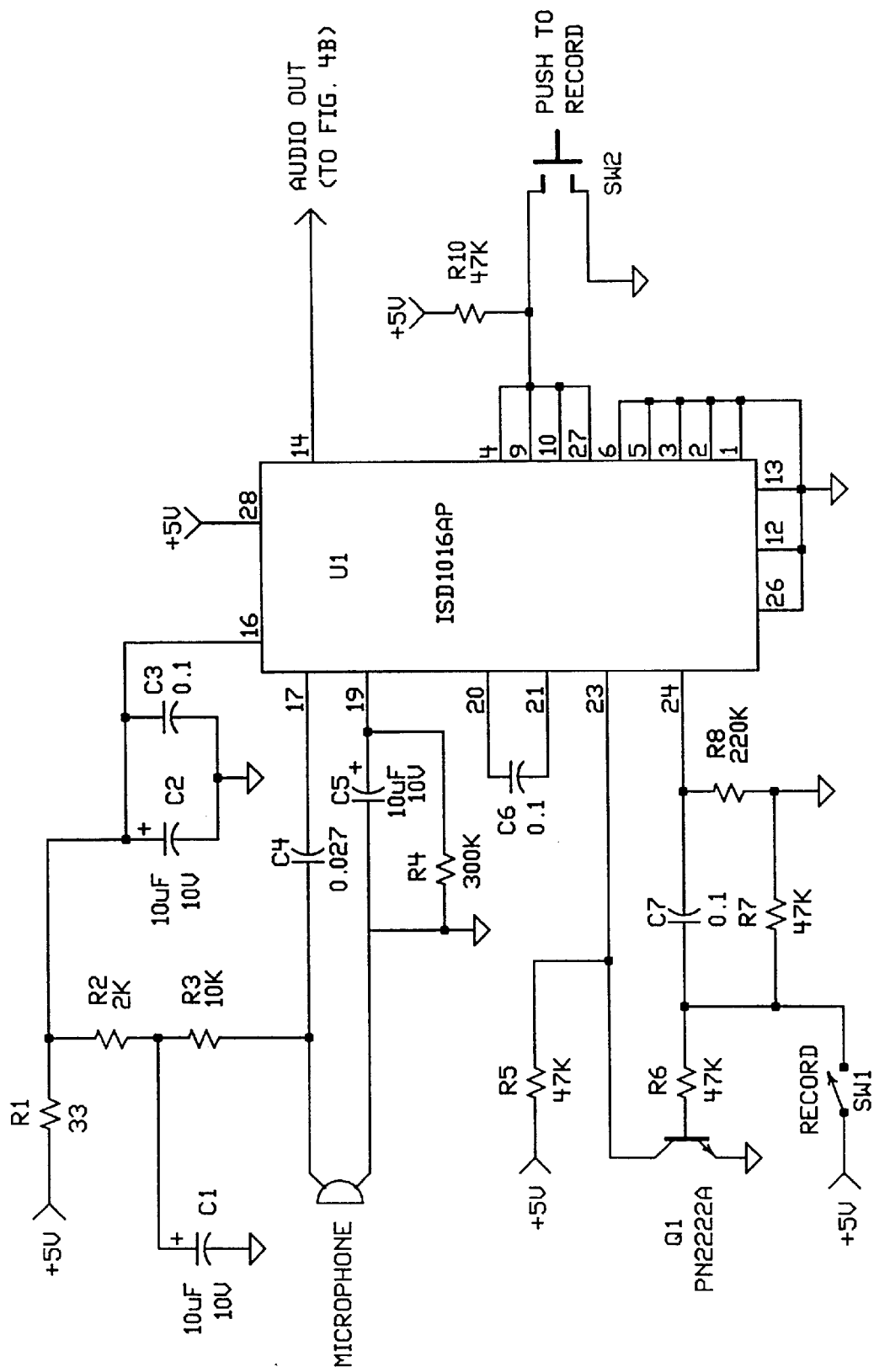
FIG. 4A is one half of a detailed schematic diagram of the apparatus of FIG. 1.
Figure 4B:
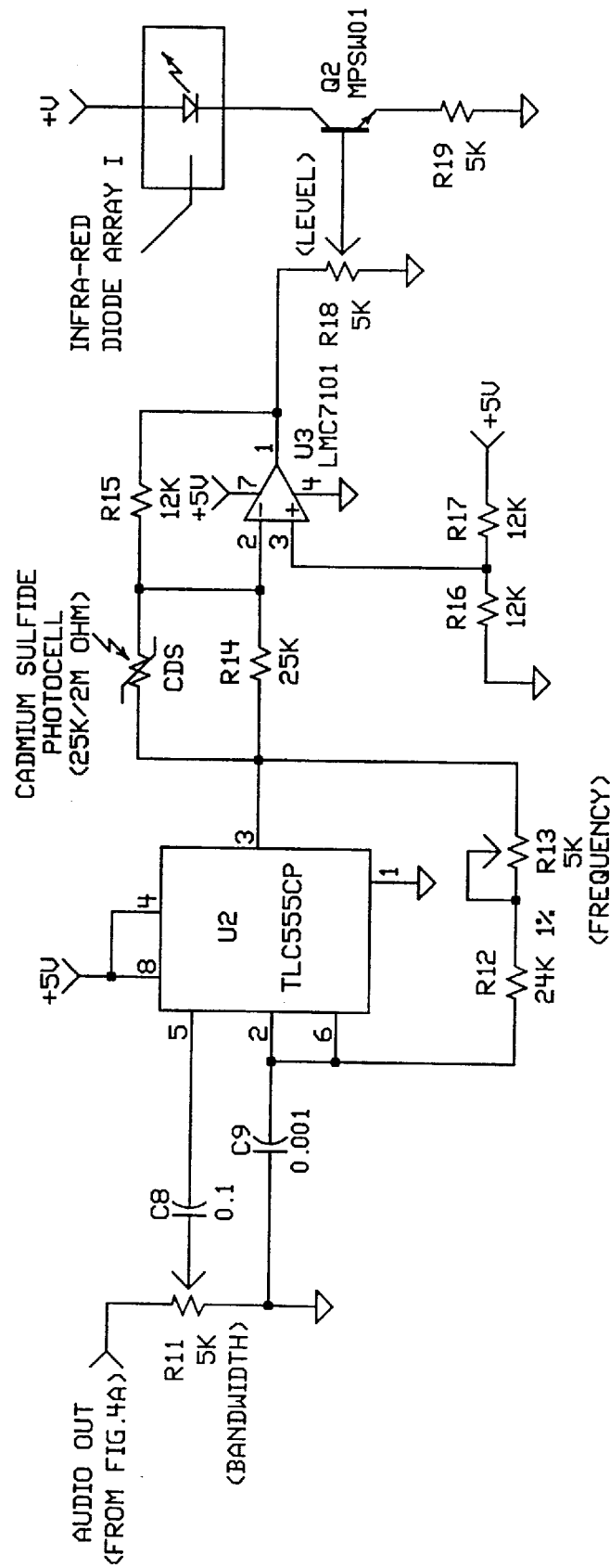
FIG. 4B is the other half of the detailed schematic diagram set forth in FIG. 2A.

The modulated output signal from frequency modulator circuit U2 is input to a variable gain modifier in the form of an integrated circuit U3. The gain of this network is determined by a cadmium sulfide photocell CDS which is placed in the surrounding environment periodically exposed to ambient light. As depicted, photocell CDS has a nominal resistance of 25 Kilohms for illuminated (i.e., light) conditions, and 2 Megohms for non-illuminated (i.e., dark) conditions. The nominal gain of gain circuit U3 is determined by the values of R14 and R15 on FIG. 4B. The magnitude gain of the amplifier network can be expressed by the following formula:

$$\text{Gain Magnitude} = R15/[(R14 \times Rcds)/(R14+Rcds)]$$

where Rcds equals the nominal resistance of photocell CDS. With reference to the values of R14 and R15 shown on FIG. 4B, it will be seen that the nominal gain magnitude of the amplifier is 1.0 and 0.5 for fully illuminated and non-illuminated ambient light conditions, respectively. The gain magnitude varies from 1.0 to 0.5 for conditions between full illumination and no illumination, which is the desired operation since non-illuminated conditions (e.g., night) require a reduced gain so that a FM receiver is not over driven in low ambient light conditions. As discussed below, it is preferred that the gain magnitude be in inverse proportion to the electronic receiver sensitivity for various ambient light conditions.

The frequency modulated output from circuit U3 is input to a buffer amplifier in the form of transistor Q2. The level of the signal applied to the base of transistor Q2 is determined by potentiometer R18. An infrared diode array I is driven by transistor Q2, and the maximum value of the modulation signal current flowing in the diode array is determined by the value of R19. For the values depicted on FIG. 4B, the maximum current is nominally 200 milliamperes.

As previously noted, it is preferred that the transmitter of this invention be used in combination with an electronic receiver for receiving the lightwave signal and converting it into sound. The electronic receivers of the invention are especially adapted for use with an array of single or multi-channel emitters of this invention. The electronic receivers are preferably portable and are comprised of four basic components, (i) a non-visual communicator, (ii) a self-contained source of electrical energy, (iii) a detector for receiving the lightwave signal, and (iv) electronics for converting the sensed signal into intelligible non-visual communication emanating from the communicator both in the presence and in the absence of an ambient background of light energy, the electronics including, among other things, a primary PIN photodiode. The electronic receiver also should be effective as the sensed signal approaches the shot noise detection limit of the primary PIN photodiode in the presence of a steady state photocurrent.

The non-visual communicator of the electronic receiver can be of various types such as a Morse code cell, a tactile braille communicating device or any other electromechanical conversion device. Preferably however it is a small audio speaker or earphone system. When the communicator is an audio or earphone speaker system, the electronics of the receiver converts the sensed signal into intelligible speech emanating from the speaker system by converting the signal into an amplified time-varying detector signal photocurrent and delivering the amplified photocurrent to the speaker system to actuate the same.

As the self-contained source of electrical energy, the electronic receiver will usually include one or more small electrical batteries. However, a suitable photovoltaic cell system for converting light energy into electrical energy for the electronic receiver may be employed.

Referring now to the preferred embodiment of the electronic receiver depicted at FIGS. 5–8C, a signal from the array of single channel emitters of this invention combined with ambient background radiation is received by primary PIN detector, D1. A auxiliary PIN detector, D2, receives ambient background radiation and cancels the ambient noise signal from primary PIN detector, D1. using active sink network of Q1. In essence, shot noise current due to the main PIN photodiode, the active sink and the auxiliary PIN photodiode are non-coherent and sum root mean square, while signal currents from the main and auxiliary PIN photodiodes are coherent and sum directly. Further, over a given design range, the steady state photocurrent of the auxiliary PIN photodiode does not contribute to the active sink current and, hence, does not produce additional shot noise in the active sink. The device of the figures thus utilizes a circuit topology in which the main PIN photodiode, D1, is operated in the reverse bias or photoresistive mode and the auxiliary PIN photodiode, D2, is operated in the photovoltaic mode. The active sink is typically a plurality of semiconductor devices such as transistors or integrated circuits. Further signal conditioning and amplification is provided by input stage Q2, cascode output Q3 and impedance converter Q4, respectively.

Figure 6:
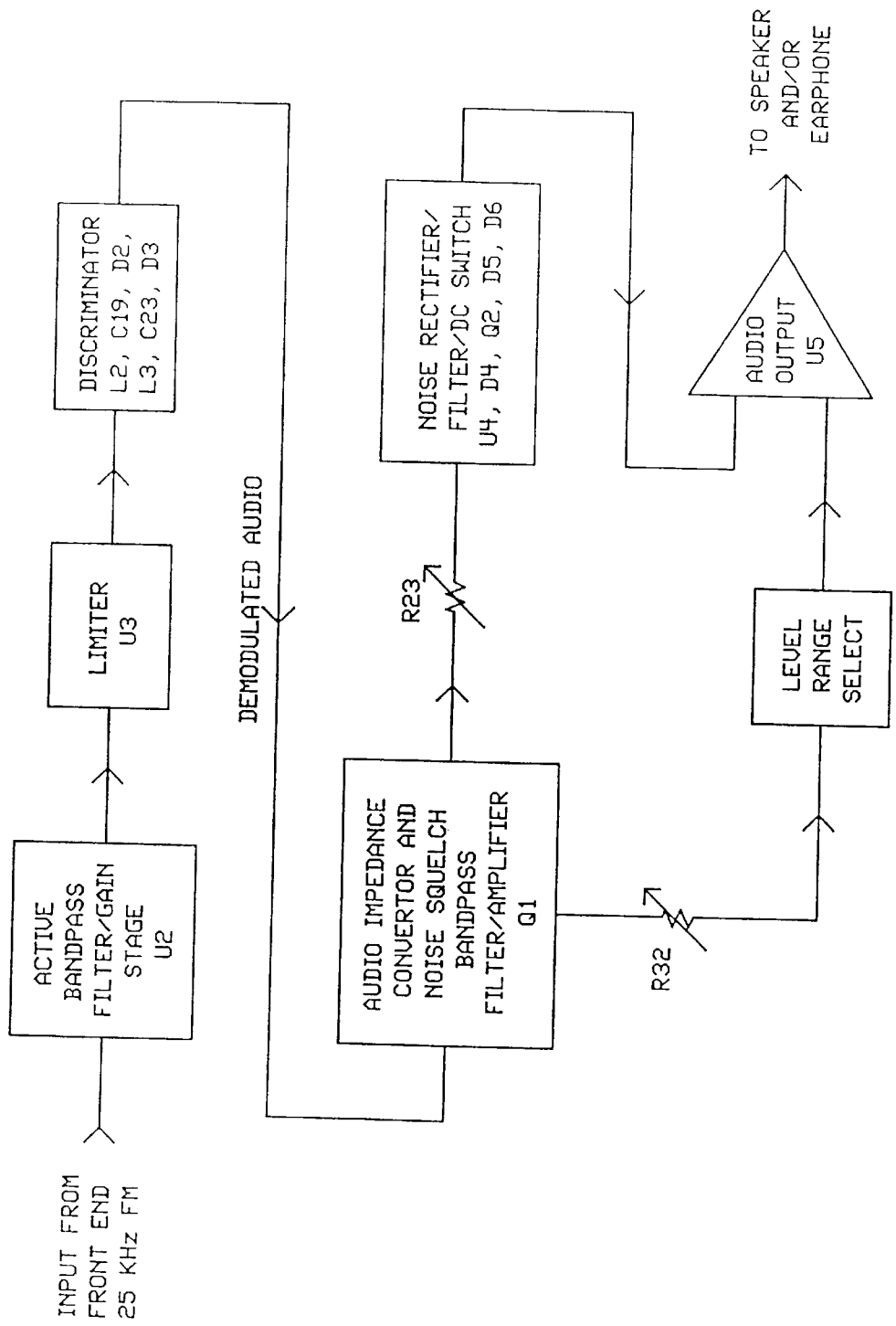
FIG. 6 is a block diagram of a means in the electronic receiver of FIG. 5 for filtering and detecting the received signal and for squelching interference from ambient light energy (i.e., background noise).

The output from the impedance converter, Q4, is then directed to the tuned radio frequency FM receiver of FIG. 6. The resulting signal is conditioned by active bandpass filter/gain stage U2, limiter U3, and discriminator network made up of L2, C19, D2, L3, C23, and D3 (see FIG. 8A) which produces a demodulated audio signal. The demodulated audio signal is further conditioned by the audio impedance convertor and noise squelch bandpass filter/amplifier network of Q1 (see FIG. 8A for details of the network). Two signals are generated by the network of Q1 of FIGS. 4 and 8B.

Figure 8B:
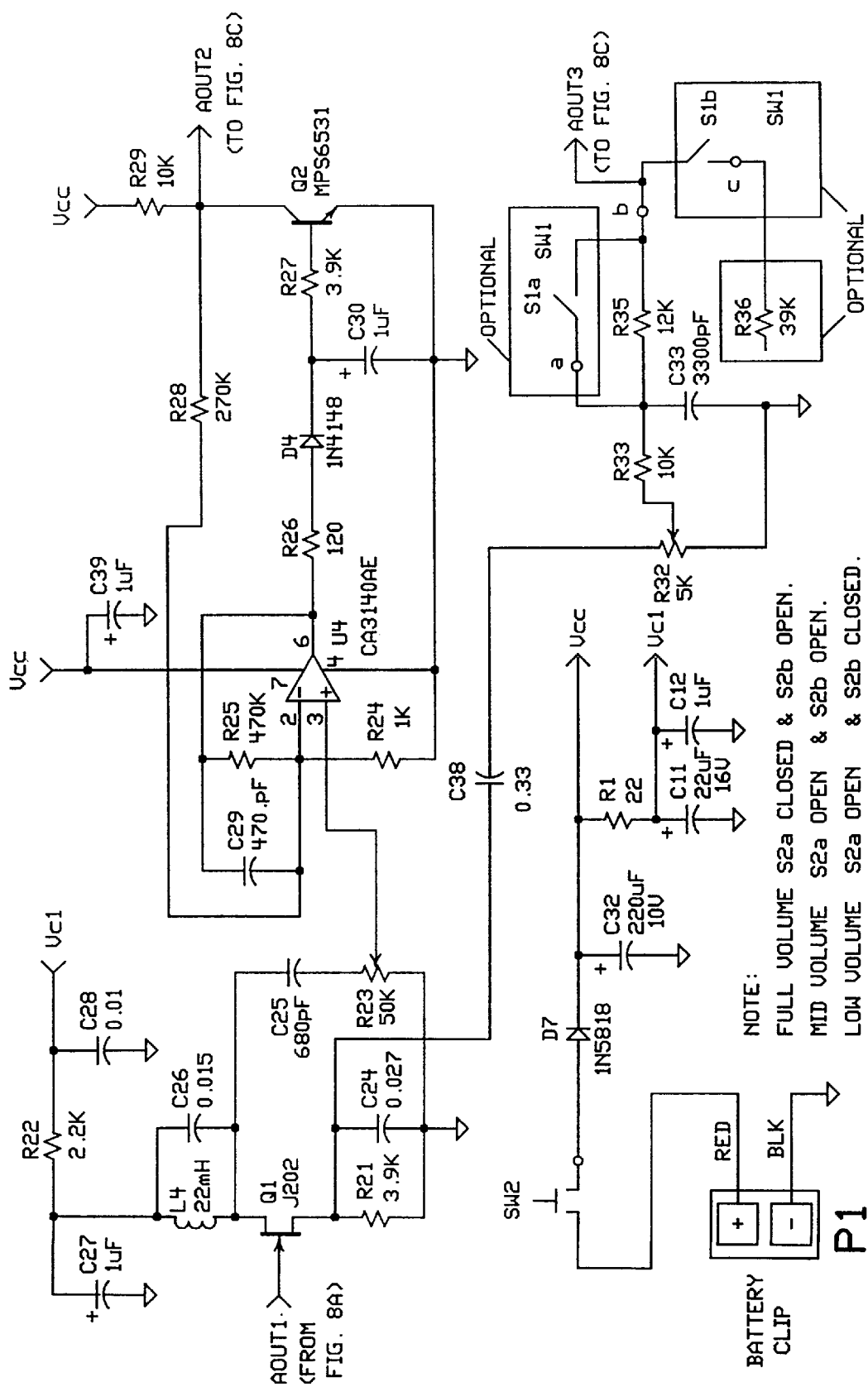

The first signal from Q1 of FIGS. 6 and 8B is a noise squelch signal which is directed via potentiometer R23 to the noise rectifier/filter/DC switch U4, D4, Q2, D5, and D6 (see FIGS. 8B and 8C for details of this network). The output of the noise rectifier/filter/DC switch which delivers the noise squelch level is then directed to the audio output amplifier U5.

The second signal from Q1 of FIGS. 6 and 8B is directed to a level range select network via potentiometer R32. The output from the level range select network is then directed to the audio output amplifier U5. The output from the audio output amplifier U5 is then used to actuate the speaker or other non-visual communicator.

Figure 5:
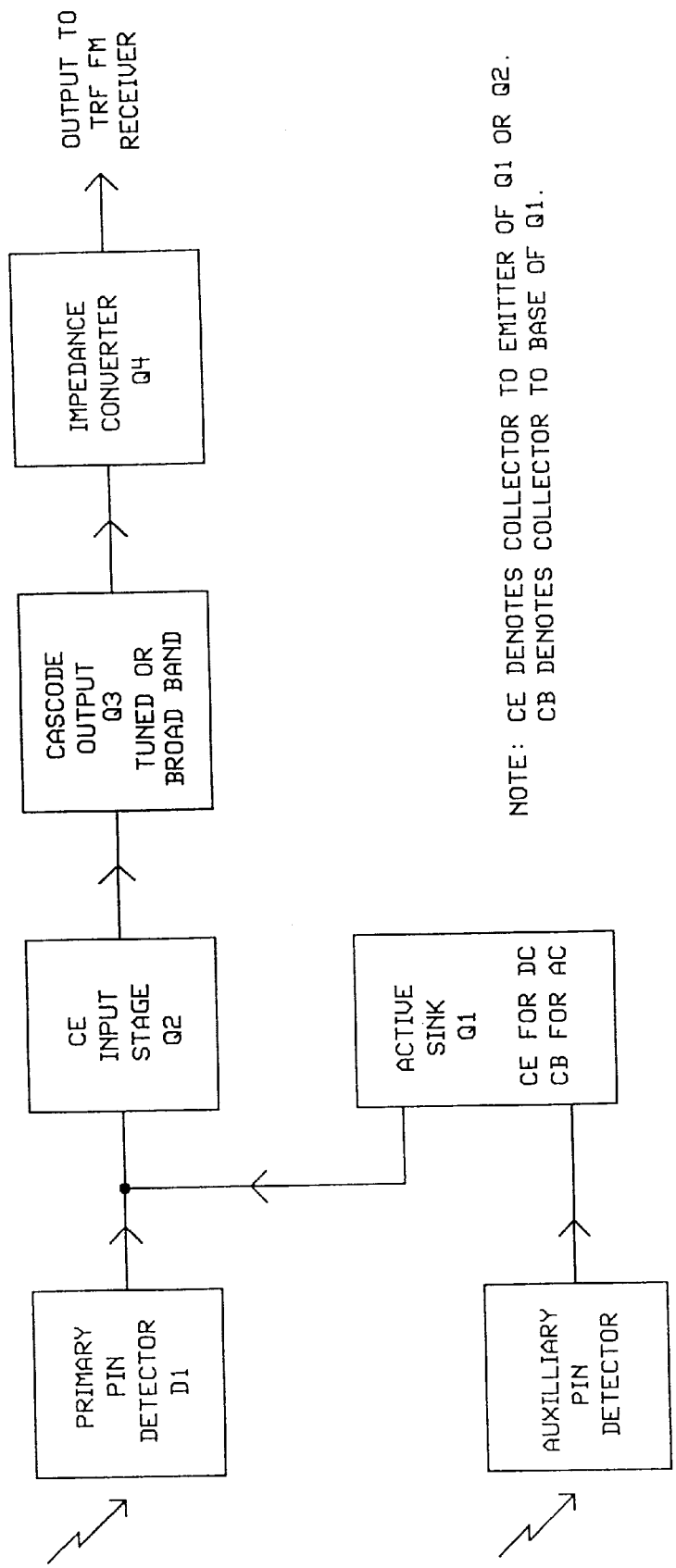
FIG. 5 is a block diagram of a typical front end (signal sensing and receiving portion) of an electronic receiver of this invention.

Complete details concerning the electronic circuitry referred to in FIGS. 5 and 6 are set forth in FIGS. 7 and 8A–8C, respectively.

A feature of this invention in preferred embodiments is that the electronic receiver includes an active sink (e.g., broad band semiconductor devices) for ambient light-induced steady-state detector photocurrent which effectively removes the noise in the form of ambient background noise resulting from high ambient illumination such as sunlight or artificial lighting. The device is therefore capable of detecting a signal that approaches the shot noise detection limit of a PIN photodiode in the presence of a steady state photocurrent. In doing so the device in the form depicted in the figures converts the sensed signal from the array of single channel emitters into intelligible speech emanating from the speaker by converting the signal into an amplified time-varying detector signal photocurrent and delivering the amplified photocurrent to the speaker to actuate the same.

Preferably, the transmitters sending the signal to the preferred electronic receiver are those of this invention, so that the signal is adjusted by the transmitters to compensate for changes in ambient light energy (i.e., in light conditions, the signal strength increases, and in dark conditions, the signal strength decreases). This feature, in essence, compliments the filtering capability of the above-described receiver. Thus, when ambient background light energy is at a peak (i.e., in high ambient illumination conditions), the possibility that sensitivity of the electronic receiver to the desired signal may be diminished is countered by the fact that signal strength of the transmitter peaks concurrently and thus is more easily detected. Likewise, when the ambient background light energy is very low (i.e., in low ambient illumination conditions), sensitivity of the electronic receiver to the desired signal increases, and the signal strength of the transmitter adjusts downwardly concurrently, thereby preventing the transmission from exceeding the desired range.

As may now be appreciated, it is not require that separate audio storage and retrieval and modulation devices be coupled to each separately positioned lightwave emitter. For example, a single audio storage and retrieval device, in combination with a single modulator, may be used with two or more infrared diode arrays, at least one array being positioned at the front portion of the vehicle, and at least one array being positioned at the side of the vehicle. In this way, the same message is stored and transmitted through separate emitters whose signal patterns cover different areas around the vehicle. Thus, it shall be understood that, as used throughout this specification and the appended claims, the terms frontal transmitter, side transmitter, and interior transmitter, when present together (in any combination) to describe the components of a system or device of this invention, mean one or more sound storage and retrieval devices for controllably storing and transmitting an audio signal combined with a one or more modulators for modulating the frequency of the audio signal to produce a modulated output signal, and, at each of the respective locations (i.e., front, side, interior) separate light energy receiver components, controller components, and emitter components.

The disclosure in each U.S. patent, in each U.S. patent application, and in any other publication cited herein is incorporated entirely herein by reference.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A passenger transit system comprising:
   a) a plurality of terminals at which one or more conveyance vehicles periodically arrive and depart, the terminals each having at least one adjacent walkway, and the conveyance vehicles each having front, back and side portions defining an enclosure for occupation by one or more passengers, one of the side portions having therein at least one door mechanism enabling passenger ingress to and egress from the vehicle; and
   b) at least one transmitter disposed at each of one or more of the terminals, each transmitter delivering a frequency modulated lightwave signal in a three-dimensional pattern so as to enable a person using the walkway to be within the pattern of the transmitter as the person approaches the respective terminal;
the signals from each of the transmitters being the same or different, and if suitably received and converted, providing intelligible communication to a person within the pattern.

2. A system according to claim 1 wherein the signals are suitably received and converted by a portable directional receiver comprising a non-visual communicator, a self-contained source of electrical energy, a detector for receiving a sensed frequency modulated lightwave signal, and electronics comprising an active sink for ambient light-induced steady state detector photocurrent, a primary PIN photodiode operated in the photoresistive mode, and a secondary PIN photodiode operated in the photovoltaic mode, the electronics converting the sensed signal into intelligible non-visual communication emanating from the communicator both in the presence and in the absence of an ambient background of light energy, and the receiver being effective as the sensed signal approaches the shot noise detection limit of the primary PIN photodiode in the presence of a steady state photocurrent.

3. A system according to claim 2 wherein the frequency modulated lightwave signal is of variable intensity, and wherein each transmitter comprises
   (a) an emitter for sending the frequency modulated lightwave signal,
   (b) a light energy receiver for detecting a change in the level of surrounding ambient light energy and for producing a response to such change in proportion to the change detected, and
   (c) a controller for adjusting, directly or indirectly, the frequency modulated lightwave signal in response to the light energy receiver response to the change detected.

4. A system according to claim 3 wherein the light energy receiver comprises a photocell having a resistance which is inversely proportional to the ambient light energy detected, wherein the controller comprises a variable gain amplifier, wherein the lightwave signals are infrared lightwave signals, and wherein the emitter comprises an infrared diode array.

5. A system according to claim 1 wherein the frequency modulated lightwave signal is of variable intensity, and wherein each transmitter comprises
   (a) an emitter for sending the frequency modulated lightwave signal,
   (b) a light energy receiver for detecting a change in the level of surrounding ambient light energy and for producing a response to such change in proportion to the change detected, and
   (c) a controller for adjusting, directly or indirectly, the frequency modulated lightwave signal in response to the light energy receiver response to the change detected.

6. A system according to claim 5 wherein the light energy receiver comprises a photocell having a resistance which is inversely proportional to the ambient light energy detected, wherein the controller comprises a variable gain amplifier, wherein the lightwave signals are infrared lightwave signals, and wherein the emitter comprises an infrared diode array.

7. A system according to claim 1 further comprising
   a frontal transmitter disposed at the front of the vehicle and delivering a frontal frequency modulated lightwave signal in a three-dimensional pattern so as to enable a person disposed ahead of and on the door side of the approaching vehicle to be within the frontal signal pattern as the vehicle continues along at least a substantial portion of its normal line of travel and approaches such person;
the front signal, if suitably received and converted, providing intelligible communication to a person within the frontal signal pattern.

8. A system according to claim 7 wherein the frontal signal pattern is cone-like and has a beam width in the range of about 30° to about 90° projected outwardly in front of the vehicle such that the axis of the frontal cone-like pattern is oriented at a predetermined angle relative to the line of travel of the vehicle.

9. A system according to claim 7 wherein the signals are transmitted at a modulated frequency of about 25 KHz with a band width of about 6 KHz and have an infrared carrier frequency in the range of about 850 to about 950 nanometers.

10. A system according to claim 7 wherein the signals are suitably received and converted by a portable directional receiver.

11. A system according to claim 10 wherein the portable directional receiver comprises a non-visual communicator, a self-contained source of electrical energy, a detector for receiving a sensed frequency modulated lightwave signal, and electronics comprising an active sink for ambient light-induced steady state detector photocurrent, a primary PIN photodiode operated in the photoresistive mode, and a secondary PIN photodiode operated in the photovoltaic mode, the electronics converting the sensed signal into intelligible non-visual communication emanating from the communicator both in the presence and in the absence of an ambient background of light energy, and the receiver being effective as the sensed signal approaches the shot noise detection limit of the primary PIN photodiode in the presence of a steady state photocurrent.

12. A system according to claim 11 wherein the frequency modulated lightwave signal is of variable intensity, and wherein each transmitter comprises
   (a) an emitter for sending the frequency modulated lightwave signal,
   (b) a light energy receiver for detecting a change in the level of surrounding ambient light energy and for producing a response to such change in proportion to the change detected, and (c) a controller for adjusting, directly or indirectly, the frequency modulated lightwave signal in response to the light energy receiver response to the change detected.

13. A system according to claim 10 wherein the frequency modulated lightwave signal is of variable intensity, and wherein each transmitter comprises (a) an emitter for sending the frequency modulated lightwave signal, (b) a light energy receiver for detecting a change in the level of surrounding ambient light energy and for producing a response to such change in proportion to the change detected, and (c) a controller for adjusting, directly or indirectly, the frequency modulated lightwave signal in response to the light energy receiver response to the change detected.

14. A system according to claim 13 wherein the light energy receiver comprises a photocell having a resistance which is inversely proportional to the ambient light energy detected, wherein the controller comprises a variable gain amplifier, wherein the lightwave signals are infrared lightwave signals, and wherein the emitter comprises an infrared diode array.

15. A passenger transit system comprising:

a) at least one conveyance vehicle having front, back and side portions defining an enclosure for occupation by one or more passengers, one of the side portions having therein at least one door mechanism enabling passenger ingress to and egress from the vehicle, the side portion being hereinafter referred to as the door side; and b) a frontal transmitter disposed at the front of the vehicle and delivering a frontal frequency modulated lightwave signal in a three-dimensional pattern so as to enable a person disposed ahead of and on the door side of the approaching vehicle to be within the frontal signal pattern as the vehicle continues along at least a substantial portion of its normal line of travel and approaches such person;

the frontal signal, if suitably received and converted, providing intelligible communication to a person within the frontal signal pattern.

16. A system according to claim 15 further comprising a side transmitter disposed at the door side of the vehicle and delivering a side frequency modulated lightwave signal in a three-dimensional pattern so as to enable a person in proximity to the vehicle when stopped and disposed either ahead of and to the door side of the vehicle, directly to the door side of the vehicle, or behind and to the door side to be within the side signal pattern while the vehicle remains stopped; the frontal and side signals being the same or different and, if suitably received and converted, providing intelligible communication to a person within their respective patterns.

17. A system according to claim 16 wherein the frontal signal pattern is cone-like and has a beam width in the range of about 30° to about 90° projected outwardly in front of the vehicle such that the axis of the frontal cone-like pattern is oriented at a predetermined angle relative to the line of travel of the vehicle, and wherein the side signal pattern is cone-like and has a beam width in the range of about 60° to about 170° projected outwardly from the door side of the vehicle such that the axis of the side cone-like pattern is oriented in a predetermined direction to maximize exposure of potential passengers to the side signal.

18. A system according to claim 16 wherein the first signal is adjusted to extend for a distance of at least 300 feet ahead of the vehicle, and wherein the second signal is adjusted to extend for a distance of at least 30 feet from the door side of the vehicle.

19. A system according to claim 16 further comprising an interior transmitter disposed within the vehicle and delivering a interior frequency modulated lightwave signal in a three-dimensional pattern so as to enable a person within the vehicle also to be within the interior signal pattern; each of the frontal, side and interior signals being the same or different and, if suitably received and converted, providing intelligible communication to a person within their respective patterns.

20. A system according to claim 16 further comprising a ground-based transmitter disposed in proximity to a point of conveyance vehicle passenger embarking and/or disembarking, the ground-based transmitter delivering a ground-based frequency modulated lightwave signal in a three-dimensional pattern so as to enable a person in proximity to the point of embarking and/or disembarking to be within the ground-based signal pattern; each of the frontal, side and ground-based signals being the same or different and, if suitably received and converted, providing intelligible communication to a person within their respective patterns.

21. A system according to claim 20 wherein the frontal signal pattern is cone-like and has a beam width in the range of about 30° to about 90° projected outwardly in front of the vehicle such that the axis of the frontal cone-like pattern is oriented at a predetermined angle relative to the line of travel of the vehicle, wherein the side signal pattern is cone-like and has a beam width in the range of about 60° to about 170° projected outwardly from the door side of the vehicle such that the axis of the side cone-like pattern is oriented in a predetermined direction, and wherein the ground-based signal pattern is cone-like and has a beam width in the range of about 30° to about 360° projected across the point of conveyance vehicle passenger embarking and/or disembarking such that the axis of the ground-based cone-like pattern is oriented in a predetermined direction to maximize exposure of potential passengers to the ground-based signal.

22. A system according to claim 20 wherein the frontal signal is adjusted to extend for a distance of at least 300 feet ahead of the vehicle, and wherein the side signal is adjusted to extend for a distance of at least 30 feet from the door side of the vehicle, and wherein the interior signal is adjusted to extend for a distance sufficient to traverse substantially all passengers within the vehicle during normal use.

23. A system according to claim 19 further comprising a ground-based transmitter disposed in proximity to a point of conveyance vehicle passenger embarking and/or disembarking, the ground-based transmitter delivering a ground-based frequency modulated lightwave signal in a three-dimensional pattern so as to enable a person in proximity to the point of embarking and/or disembarking to be within the ground-based signal pattern; each of the frontal, side, interior and ground-based signals being the same or different and, if suitably received and converted, providing intelligible communication to a person within their respective patterns.

24. A system according to claim 15 further comprising an interior transmitter disposed within the vehicle and delivering an interior frequency modulated lightwave signal in a three-dimensional pattern so as to enable a person within the vehicle to be within the interior signal pattern; the frontal and interior signals being the same or different and, if suitably received and converted, providing intelligible communication to a person within their respective patterns.

25. A system according to claim 24 further comprising a ground-based transmitter disposed in proximity to a point of conveyance vehicle passenger embarking and/or disembarking, the ground-based transmitter delivering a ground-based frequency modulated lightwave signal in a three-dimensional pattern so as to enable a person in proximity to the point of embarking and/or disembarking to be within the ground-based signal pattern; each of the frontal, interior and ground-based signals being the same or different and, if suitably received and converted, providing intelligible communication to a person within their respective patterns.

26. A system according to claim 15 further comprising a ground-based transmitter disposed in proximity to a point of conveyance vehicle passenger embarking and/or disembarking, the ground-based transmitter delivering a ground-based frequency modulated lightwave signal in a three-dimensional pattern so as to enable a person in proximity to the point of embarking and/or disembarking to be within the ground-based signal pattern; the frontal and ground-based signals being the same or different and, if suitably received and converted, providing intelligible communication to a person within their respective patterns.

27. A system according to claim 15 wherein the frontal signal pattern is cone-like and has a beam width in the range of about 30° to about 90° projected outwardly in front of the vehicle such that the axis of the frontal cone-like pattern is oriented at a predetermined angle relative to the line of travel of the vehicle.

28. A system according to claim 15 wherein the frontal signal is adjusted to extend for a distance of at least 300 feet ahead of the vehicle.

29. A system according to claim 15 wherein the frontal signal is transmitted at a modulated frequency of about 25 KHz with a band width of about 6 KHz and have an infrared carrier frequency in the range of about 850 to about 950 nanometers.

30. A system according to claim 15 wherein the frontal signal is suitably received and converted by a portable directional receiver.

31. A system according to claim 30 wherein the portable directional receiver comprises a non-visual communicator, a self-contained source of electrical energy, a detector for receiving a sensed frequency modulated lightwave signal, and electronics comprising an active sink for ambient light-induced steady state detector photocurrent, a primary PIN photodiode operated in the photoresistive mode, and a secondary PIN photodiode operated in the photovoltaic mode, the electronics converting the sensed signal into intelligible non-visual communication emanating from the communicator both in the presence and in the absence of an ambient background of light energy, and the receiver being effective as the sensed signal approaches the shot noise detection limit of the primary PIN photodiode in the presence of a steady state photocurrent.

32. A system according to claim 30 wherein the frequency modulated lightwave signal is of variable intensity, and wherein the transmitter comprises
(a) an emitter for sending the frequency modulated lightwave signal,
(b) a light energy receiver for detecting a change in the level of surrounding ambient light energy and for producing a response to such change in proportion to the change detected, and
(c) a controller for adjusting, directly or indirectly, the frequency modulated lightwave signal in response to the light energy receiver response to the change detected.

33. A system according to claim 32 wherein the portable directional receiver comprises a non-visual communicator, a self-contained source of electrical energy, a detector for receiving a sensed frequency modulated lightwave signal, and electronics comprising an active sink for ambient light-induced steady state detector photocurrent, a primary PIN photodiode operated in the photoresistive mode, and a secondary PIN photodiode operated in the photovoltaic mode, the electronics converting the sensed signal into intelligible non-visual communication emanating from the communicator both in the presence and in the absence of an ambient background of light energy, and the receiver being effective as the sensed signal approaches the shot noise detection limit of the primary PIN photodiode in the presence of a steady state photocurrent.

34. A system according to claim 33 wherein the frontal signal pattern is cone-like and has a beam width in the range of about 30° to about 90° projected outwardly in front of the vehicle such that the axis of the frontal cone-like pattern is oriented at a predetermined angle relative to the line of travel of the vehicle.

35. A system according to claim 34 wherein the frontal signal is adjusted to extend for a distance of at least 300 feet ahead of the vehicle.

36. A system according to claim 35 wherein the frontal signal is transmitted at a modulated frequency of about 25 KHz with a band width of about 6 KHz and have an infrared carrier frequency in the range of about 850 to about 950 nanometers.

37. A system according to claim 15 wherein the frequency modulated lightwave signal is of variable intensity, and wherein the transmitter comprises
(a) an emitter for sending the frequency modulated lightwave signal,
(b) a light energy receiver for detecting a change in the level of surrounding ambient light energy and for producing a response to such change in proportion to the change detected, and
(c) a controller for adjusting, directly or indirectly, the frequency modulated lightwave signal in response to the light energy receiver response to the change detected.

38. In a passenger conveyance vehicle having front, back and side portions defining an enclosure for occupation by one or more passengers, one of the side portions having therein at least one door mechanism enabling passenger ingress to and egress from the vehicle, the side portion being hereinafter referred to as the door side, improvement which comprises
a frontal transmitter disposed at the front of the vehicle and delivering a frontal frequency modulated lightwave signal in a three-dimensional pattern so as to enable a person disposed ahead of and on the door side of the approaching vehicle to be within the frontal signal pattern as the vehicle continues along at least a substantial portion of its normal line of travel and approaches such person;
the front signal, if suitably received and converted, providing intelligible communication to a person within the frontal signal pattern.

39. The improvement according to claim 38 further comprising a side transmitter disposed at the door side of the vehicle and delivering a side frequency modulated lightwave signal in a three-dimensional pattern so as to enable a person in proximity to the vehicle when stopped and disposed either ahead of and to the door side of the vehicle, directly to the door side of the vehicle, or behind and to the door side to be within the side signal pattern while the vehicle remains stopped; the frontal and side signals being the same or different and, if suitably received and converted, providing intelligible communication to a person within their respective patterns.

40. The improvement according to claim 39 wherein the frontal signal pattern is cone-like and has a beam width in the range of about 30° to about 90° projected outwardly in front of the vehicle such that the axis of the frontal cone-like pattern is oriented at a predetermined angle relative to the line of travel of the vehicle, and wherein the side signal pattern is cone-like and has a beam width in the range of about 60° to about 170° projected outwardly from the door side of the vehicle such that the axis of the side cone-like pattern is oriented in a predetermined direction to maximize exposure of potential passengers to the side signal.

41. The improvement according to claim 39 wherein the frontal signal is adjusted to extend for a distance of at least 300 feet ahead of the vehicle, and wherein the side signal is adjusted to extend for a distance of at least 30 feet from the door side of the vehicle.

42. The improvement according to claim 39 further comprising an interior transmitter disposed within the vehicle and delivering a interior frequency modulated lightwave signal in a three-dimensional pattern so as to enable a person within the vehicle also to be within the interior signal pattern; each of the frontal, side and interior signals being the same or different and, if suitably received and converted, providing intelligible communication to a person within their respective patterns.

43. The improvement according to claim 42 wherein the frontal signal is adjusted to extend for a distance of at least 300 feet ahead of the vehicle, and wherein the side signal is adjusted to extend for a distance of at least 30 feet from the door side of the vehicle, and wherein the interior signal is adjusted to extend for a distance sufficient to traverse substantially all passengers within the vehicle during normal use.

44. The improvement according to claim 39 wherein the frontal and side signals are transmitted at a modulated frequency of about 25 KHz with a band width of about 6 KHz and have an infrared carrier frequency in the range of about 850 to about 950 nanometers.

45. The improvement according to claim 39 wherein any one or more of the frequency modulated lightwave signals is of variable intensity, and wherein at least one of the respective transmitters corresponding thereto comprises (a) a transmitter for sending the frequency modulated lightwave signal, (b) a light energy receiver for detecting a change in the level of surrounding ambient light energy and for producing a response to such change in proportion to the change detected, and (c) a controller for adjusting, directly or indirectly, the frequency modulated lightwave signal in response to the light energy receiver response to the change detected.

46. The improvement according to claim 38 further comprising an interior transmitter disposed within the vehicle and delivering an interior frequency modulated lightwave signal in a three-dimensional pattern so as to enable a person within the vehicle to be within the interior signal pattern; the frontal and interior signals being the same or different and, if suitably received and converted, providing intelligible communication to a person within their respective patterns.

* * * * *